Feb. 21, 1950 S. B. COLEMAN 2,498,070
CONTROL MEANS FOR SOUND-SLIDE FILM PROJECTORS
Filed Oct. 23, 1946 2 Sheets-Sheet 1

INVENTOR.
SIDNEY B. COLEMAN
BY A. D. T. Libby
Attorney

Feb. 21, 1950        S. B. COLEMAN        2,498,070
CONTROL MEANS FOR SOUND-SLIDE FILM PROJECTORS
Filed Oct. 23, 1946        2 Sheets-Sheet 2
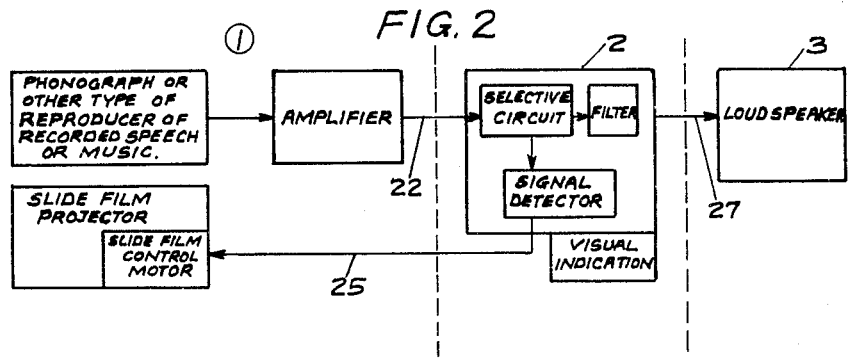
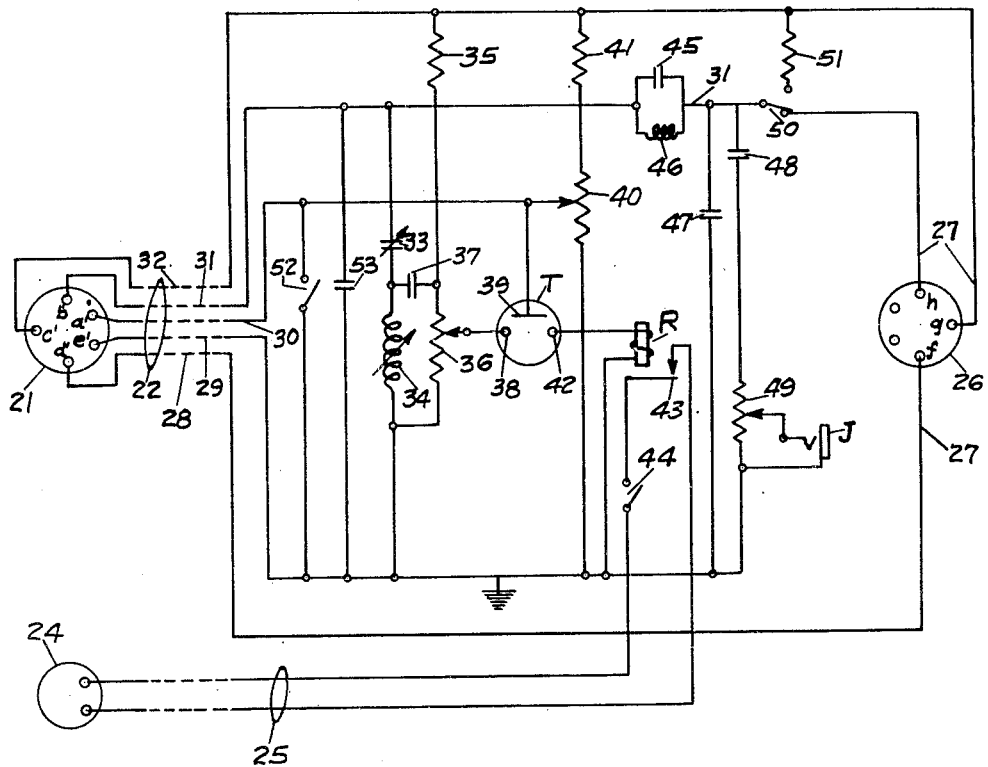
INVENTOR.
SIDNEY B. COLEMAN Patented Feb. 21, 1950

2,498,070

UNITED STATES PATENT OFFICE 2,498,070

CONTROL MEANS FOR SOUND-SLIDE FILM PROJECTORS

Sidney B. Coleman, Basking Ridge, N. J.

Application October 23, 1946, Serial No. 705,172

11 Claims. (Cl. 88—28)

This invention relates to control means for sound-slide film projector apparatus.

Widespread use is made of such apparatus for advertising, educational and entertainment purposes. Generally speaking, this apparatus includes a phonograph or other type of reproducer on which speech and/or music is recorded, together with a slide projector or equivalent by means of which a series of still pictures may be shown on the screen. For convenience, the series of pictures or illustrations are made on a film of the type generally used in motion picture projectors, but as each picture is moved into position in the projector it is viewed for a considerable interval of time before it is followed by the next picture. Musical interludes and speech, generally bearing upon the subject depicted in the projected slides, is reproduced by any one of several types of phonograph equipment such as, for example, a turntable carrying a disc, together with an electrical pickup arm amplifier and loud speaker. A definite time relationship or synchronism must be necessarily be present in order that the sound and picture may be correlated throughout the program.

It is substantially the universal practice in maintaining this time relationship between the picture and speech or discourse, to use a tonebell, gong or buzzer note recorded on the record at the proper point during the discourse, all of which is reproduced in the loud speaker. While this gong or buzzer note gives the operator of the projector the signal to move the next slide in the projector into position, this signal sound, which has been amplified along with the discourse, is heard by the audience, and since it bears no relation to the subject being presented, it distracts attention from the information that is intended to be conveyed to the listeners. I have found that in a great many instances there are a large number who listen for this loud gong note instead of to the discourse.

It is to be understood that when the operator hears this gong note, he moves the slide film in the projector so as to bring in the next succeeding picture. It has been the practice up to the present time to do this manually by the operator pulling on a cord attached to a member on the projector part of the apparatus.

It is therefore the principal object of my invention to entirely eliminate this objectionable signal now transmitted through the loud speaker and to make the operation of moving the film automatic in proper correlation with the discourse.

After a lengthy study of the problem, I have finally arrived at a satisfactory solution, and in carrying out my invention I have developed an electronic control unit which can be readily inserted between the sound slide film projector apparatus and the loud speaker so that the same may be utilized in connection with structures of this kind which have been heretofore produced. It is to be understood, however, that the apparatus making up the control unit to be described may be incorporated as a unitary part of the sound-slide film projector structure.

My invention will be readily understood by one skilled in this particular art by reference to the annexed drawings wherein:

Figure 2 is a block diagram of the essential components of the entire system.

Figure 3 is a schematic circuit diagram of the apparatus within the control unit shown in Figure 1.

Figure 1:
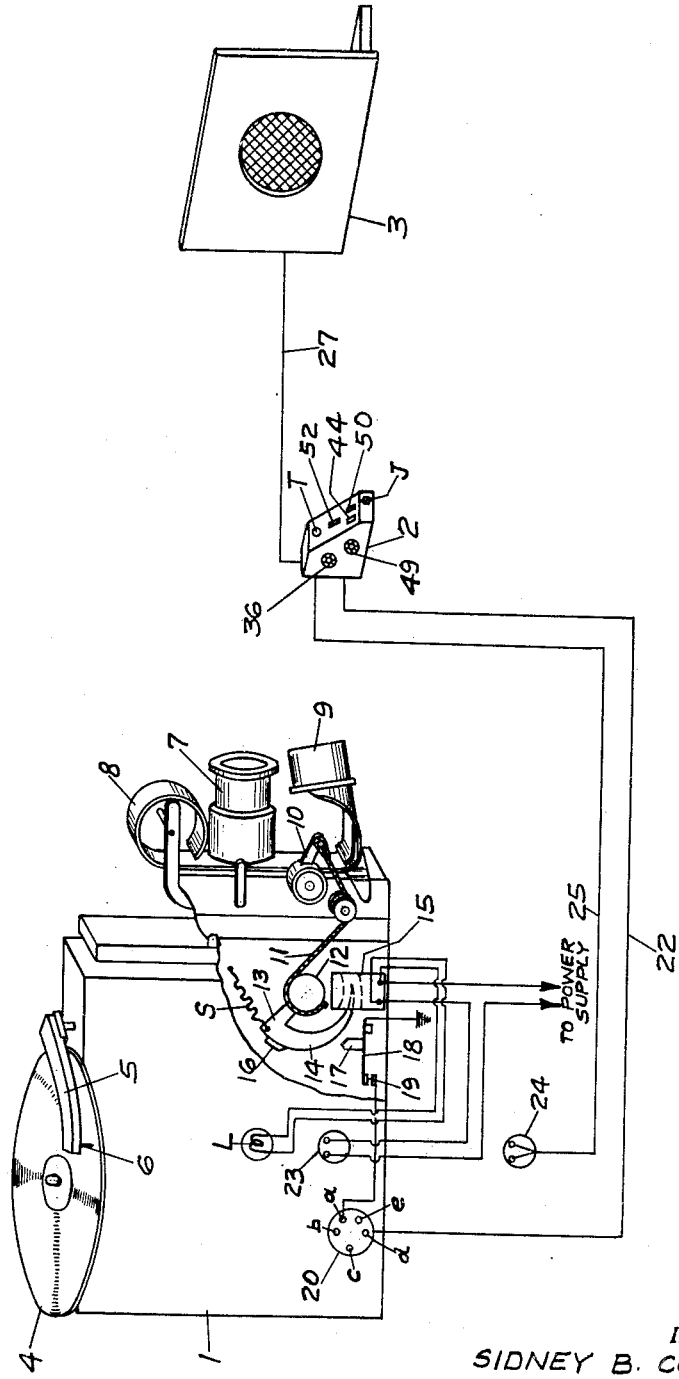
Figure 1 is a schematic arrangement showing the sound-slide film projector and loud speaker with my new control unit introduced therebetween.

In the drawings, wherein like numbers refer to corresponding parts, 1 illustrates generally the entire projector apparatus, while 2 illustrates diagrammatically the control unit, and 3 illustrates the loud speaker. The projector apparatus carries a disc 4 on which is recorded the discourse, as well as the control signal. Cooperating with the disc 4, is the usual arm 5 and pickup needle 6. At the forward end of the structure 1, is the projector per se 7, film reel 8 and wind-up reel 9. The film is moved by a control lever 10 to which a cord 11 is attached at one end, while the opposite end of the cord is fastened to a wind-up roll 12. Fastened to the roll 12, is an arm 13 of a circularly formed armature 14 that is arcuately moved by an energizing winding 15 in a manner to be later described. This electromagnetic structure is of the type shown in Cramer Patent No. 2,337,375. The armature 14 carries a cam 16 which is adapted to contact with a stud 17 fastened to a spring 18 to close the contacts 19 at a time just prior to the completion of the stroke of the armature 14, all for a purpose to be later described.

As will be seen from the block diagram of Figure 2, the electrical impulses produced from the phonograph pass through the amplifier, the output of which is connected to treminals $a$, $b$, $c$, $d$ and $e$ of a socket 20. For cooperation with this socket, a plug 21 carrying terminals $a'$ to $e'$ is utilized. A five-conductor cable 22 serves to convey the circuits from the amplifier to the control unit 2. A further socket 23 and a cooperating plug 24 serve to connect a two-conductor cable 25 from the projector apparatus 1 to the control unit 2. A socket 26 has contacts connected with conductors coming from the amplifier by way of the cable 22 and is adapted to receive a plug, not shown, connected to a three-conductor cable 27 from the loud speaker 3.

Referring to Figure 3, it will be seen that the cable 22 is made up of conductors 28, 29, 30, 31 and 32. The conductor 28 connects one side of the power supply rectifier within the projector apparatus through contacts d and d' to the contact f in the socket 26, and by way of the cable 27 to the field winding of the loud speaker which serves as a part of the power supply filter. The return circuit is by way of the cable 27 and conductor 32, and its cooperating contacts c' and c. Contacts b and b' serve to connect the plate of the output amplifier to the conductor 31, while contacts e and e' serve to complete a ground connection to the conductor 29. The contacts a and a' are connected to the conductor 30.

It will be noted from Figure 3 that a resonant circuit exists between the conductors 31 and 29 by reason of a condenser 33 and inductance 34. Connected between the conductors 32 and 29 is a resistance 35 and a potentiometer 36. A condenser 37 is bridged between the junction of the condenser 33 and inductance 34, and resistance 35 and potentiometer 36. The adjustable contact of the potentiometer 36 is connected to a starter electrode 38 of a cold cathode gas triode tube T, the anode 39 of which is connected to a potentiometer 40 as well as to the conductor 30. The potentiometer 40 is connected through a resistance 41 to a conductor 32, and to conductor 29. The cathode 42 of the tube T is connected to a relay R which has a pair of contacts 43 connected by way of the cable 25 to contacts in the plug 24. A switch 44 in one of the conductors of the cable 25 may be utilized for a purpose to be later explained.

To the conductor 31, is connected, in a series parallel arrangement, a condenser 45 and inductance 46 which act as a filter, to be later explained. Bridging the conductor 31 beyond this filter, is a condenser 47 in a bridging circuit with the ground conductor 29. The second bridging circuit between these same conductors is formed by a condenser 48 and a potentiometer 49 which is associated with a plug-in jack J. A switch 50 serves to connect a terminal h, which is in the loud speaker circuit, with the conductor 31. The switch 50 may also be moved to close a circuit through a resistance 51 for a purpose which will be shortly explained. A switch 52 is also provided for bridging the conductors 30 and 29, the purpose of which will be later explained. A condenser 53 bridges the conductors 31 and 29 in parallel with the condenser 33 and inductance 34.

The function of the various devices just described with respect to Figure 3 will now be explained. The circuit formed by the condenser 33 and inductance 34 acts to pick out and separate the signal frequency for notifying the operator of the projector that the film should be moved, or for passing this signal to the circuit components which actuate the automatic arrangement to be described. The voltage developed across the inductance 34 at resonance is applied through the condenser 37 and potentiometer 36 to the starter anode 38 of the tube T. The adjustment of the potentiometer 36 depends upon the normal volume control setting of the amplifier in the projector apparatus, since the voltage across the tuned circuit and, consequently, the voltage developed across 34 is a function of the amplifier output volume level. The combination of the condenser 37 and the potentiometer 36 aids in discriminating against incidental and transient voltages which may appear in the phonograph output that might otherwise cause false triggering of the tube T.

The resistance 35 and potentiometer 36 form a voltage divider which maintains a bias voltage on the starter electrode 38 of the tube. This bias can be made only slightly lower than the firing potential, thus enabling the circuit to function at low output volume levels. The adjustment of 36 thus becomes a sensitivity control which reduces the positive bias on the starter electrode 38 at the same time that it reduces the signal voltage applied to this electrode, thereby allowing the use of high output volume levels from the loud speaker without increasing the liability of false operation of the control unit.

By making the condenser 37 small and the potentiometer 36 relatively large in value, the selectivity of the resonant circuit is maintained sufficiently high. The condenser 53, which bridges the resonant filter circuit 33 and 34, further reduces the voltages across this tuned circuit which may arise from high-frequency transients, and provides a further safeguard against false operation. The combined impedance of the condenser 53 and the series resonant circuit 33 and 34 at the signal frequency is low, but nevertheless adequate output from the amplifier is obtained to fire the tube T.

The impedances represented by the condensers 33 and 53 are high at the low frequencies, making up the desired frequency range of speech and music, and thus do not load the amplifier at these frequencies. The filter circuit 45—46—47 is such as to pass the speech and music to the loud speaker without material change, but acts as a choke for the signal frequency, so that the same cannot be heard in the loud speaker.

The potentiometer 40 and resistance 41 form a voltage divider by means of which the anode of the tube T is maintained at the proper positive potential, slightly below its normal breakdown potential but above its sustaining potential after it becomes conducting.

The signal on the starter electrode provides the required ionization of the gas within the tube to initiate the main gap discharge which is carried mainly by the cathode 42 through the winding of the relay R to ground. The operation of the relay R, assuming that the switch 44 is closed, which it must be for automatic operation, closes the power supply circuit through the conductors of the cable 25 and contacts of the plug 24 and its cooperating socket 23, to the electromotive winding 15 as well as to a signal lamp L which may be utilized if desired.

The energization of 15 causes the armature 14 to operate the film and bring the next picture thereon into alignment with the projector 7 for exposure on the screen. The cam 16 on the armature 14 closes the switch contacts 19 as has been explained which applies ground through the conductor 30 to the anode of the tube T, thereby extinguishing the tube and releasing the relay R. A spring S serves to return the armature 14 back to normal position, ready for the next operation.

The visible glow of the tube T, when conducting, may be used, if desired, as a signal to the operator who may operate the slide control mechanism in the event that the electromagnetic structure described is not installed. The condenser 48 and potentiometer 49, together with the monitoring jack J, provide means for testing or monitoring the output with the head receiver or the equivalent. The switch 50 is used to disconnect the principal loud speaker and connect the load resistor 51 in its place, thus permitting the operator to monitor and adjust the equipment without sound from the loud speaker.

The switch 52, preferably of the momentary type, which is manually operated, may be utilized to connect the anode 39 of the tube T to ground to extinguish the tube if found necessary, but the closure of this switch does not operate the slide control of the film. It may also be mentioned that the switch 44 should be in open position when the automatic arrangement described is not being used.

While I have mentioned no particular frequency for the tone signal, I prefer to use a frequency that is higher than is essential to satisfactory quality of speech and music, although by proper filter circuits I may utilize a lower frequency.

From what has been said, it will be seen that various details may be modified without departing from the spirit of my invention or the scope of the appended claims.

What I claim is:

1. For use with a sound-slide film projector apparatus and a loud speaker wherein currents representing sounds of different types come simultaneously in amplified form from said apparatus for transmission to the loud speaker and wherein certain components of said currents come in spaced relation, in synchronism with scenes on the film, said sounds of different types including one which has a frequency preferably higher than is essential for satisfactory quality of speech and music, said one higher frequency sound serving as a signal for moving the film on the projector; electronic connecting means interposed between the loud speaker and said projector apparatus, said electronic connecting means acting to filter out said signal currents from those going to the loud speaker, said electronic means including a cold cathode gas triode tube having a starter electrode and a series resonant circuit including an inductance and condenser tuned to the frequency of the signal currents and connected through another condenser to a potentiometer connected to the starter electrode of said tube, a resistance connected to the junction of the last-mentioned condenser and the potentiometer and forming therewith a voltage divider circuit for maintaining a positive bias on the starter electrode somewhat lower than its firing potential for the purpose described.

2. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, said electronic means including a cold cathode gas triode tube having a starter electrode and a series resonant circuit including an inductance and condenser tuned to the frequency of the signal currents and connected through another condenser to a potentiometer connected to the starter electrode of said tube, a resistance connected to the junction of the last-mentioned condenser and the potentiometer and forming therewith a voltage divider circuit for maintaining a positive bias on the starter electrode somewhat lower than its firing potential, and a safeguard against high-frequency transients and false operation of the electronic means comprising a condenser connected in parallel with said series resonant circuit, the combined impedances of these two parallel circuits being low for the signal and transient frequencies, but high for the frequencies transmitted to the loud speaker.

3. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, said electronic means including a cold cathode gas triode tube having a starter electrode and a series resonant circuit including an inductance and condenser tuned to the frequency of the signal and connected through another condenser to a potentiometer connected to the starter electrode of said tube, a resistance connected to the junction of the last-mentioned condenser and the potentiometer and forming therewith a voltage divider circuit for maintaining a positive bias on the starter electrode slightly lower than its firing potential, a further voltage divider circuit comprising a resistance and a potentiometer connected across a voltage supply circuit in parallel with the first-mentioned divider circuit but having the movable member of the potentiometer connected to the anode of said tube to maintain it at the proper positive potential slightly below its normal breakdown potential but above its sustaining potential after it becomes conducting.

4. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, said electronic means including a cold cathode gas triode tube having a starter electrode and a series resonant circuit including an inductance and condenser tuned to the frequency of the signal sound and connected through another condenser to a potentiometer connected to the starter electrode of said tube, a resistance connected to the junction of the last-mentioned condenser and the potentiometer and forming therewith a voltage divider circuit for maintaining a positive bias on the starter electrode somewhat lower than its firing potential, a further voltage divider circuit comprising a resistance and a potentiometer connected across a voltage supply circuit in parallel with the first-mentioned divider circuit but having the movable member of the potentiometer connected to the anode of said tube to maintain it at the proper positive potential slightly below its normal breakdown potential but above its sustaining potential after it becomes conducting, means for moving the film a scene length at a time, a relay connected in a circuit including said cathode of the tube, and contacts closed by the relay for completing a power supply circuit through said film-moving means to energize the same and thereby cause it to move the film a picture length.

5. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, said electronic means including a cold cathode gas triode tube having a starter electrode and a series resonant circuit including an inductance and condenser tuned to the frequency of the signal sound and connected through another condenser to a potentiometer connected to the starter electrode of said tube, a resistance connected to the junction of the last-mentioned condenser and the potentiometer and forming therewith a voltage divider circuit for maintaining a positive bias on the starter electrode somewhat lower than its firing potential, a further voltage divider circuit comprising a resistance and a potentiometer connected across a voltage supply circuit in parallel with the first-mentioned divider circuit but having the movable member of the potentiometer connected to the anode of said tube to maintain it at the proper positive potential slightly below its normal breakdown potential but above its sustaining potential after it becomes conducting, means for moving the film a scene length at a time, a relay connected in a circuit including the cathode of the tube, and contacts closed by the relay for completing a power supply circuit through said film-moving means to energize the same and thereby cause it to move the film a picture length, said film-moving means comprising an electro-motive device having preferably at least 90° of arcuate movement and switch contacts actuated by said device at a time near the end of its movement for completing a circuit which will extinguish the tube, and deenergize the relay.

6. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, further filter means connected in circuit with the loud speaker for further assisting in choking out said signal sounds from the loud speaker, a monitor circuit comprising a condenser and potentiometer connected in parallel with the first-mentioned filter circuit but on the loud speaker side of the second-mentioned filter means, and a plug-in jack for a head receiver or equivalent being connected to the potentiometer for control of the monitoring volume.

7. For use with a sound-slide film projector apparatus and a loud speaker wherein currents representing sounds of different types come in amplified form from said apparatus for transmission to the loud speaker and wherein certain components of said currents come in spaced relation, in synchronism with scenes on the film, as signals for moving the film on the projector; electronic connecting means interposed between the loud speaker and said projector apparatus, said electronic connecting means acting to filter out said signal currents from those going to the loud speaker, further filter means connected in circuit with the loud speaker for further assisting in choking out said signal sounds from the loud speaker, a monitor circuit comprising a condenser and potentiometer connected in parallel with the first-mentioned filter circuit but on the loud speaker side of the second-mentioned filter means, a plug-in jack for a head receiver or equivalent being connected to the potentiometer, a switch in the loud speaker circuit, and a resistance adapted to be substituted by the switch for the primary winding of the output transformer feeding the loud speaker for the purpose of adjusting the apparatus without the loud speaker.

8. In the combination of a sound-slide film projector apparatus and a loud speaker wherein a special electrical signal along with a regular discourse of some kind is set up by the projector apparatus for transmission to the loud speaker, means for eliminating the special signal from the loud speaker, said means including a first resonant circuit including an inductance and condenser connected in series across the output circuit coming from the projector apparatus and tuned to the frequency of the special signal, a cold cathode gas triode tube having its starting electrode connected through a potentiometer and condenser to the junction between said inductance and condenser, with a resistance connected from a conductor having a suitable positive potential to the junction of the potentiometer and the second mentioned condenser, another circuit including a resistance and potentiometer connected between a conductor having a positive potential and a ground return wire, this last-mentioned potentiometer having its movable arm connected to the anode of said tube and a relay connected between the cathode of the tube and said ground return wire, an electro-magnetic device at the projector apparatus for moving the film and contactor closed by the energization of the relay for closing a circuit through said electro-magnetic device.

9. An arrangement of parts as set forth in claim 8, further characterized in that said electro-magnetic device when energized will close a pair of contacts for establishing circuits that will deenergize the tube, the relay and itself.

10. For use with a sound-slide film projector apparatus which produces hearing sounds for use in a loud speaker, from recording means such as a phonograph disc and simultaneously exhibit pictures in synchronism with the sounds; means for controlling the action of said projector which includes a note or tone of high frequency impressed on said disc at predetermined positions defined by the pictures to be exhibited from the sound recording means, amplifying means for receiving and simultaneously passing therethrough all of the electrical impulses coming from the phonograph disc, a main circuit for receiving all of said amplified impulses coming from the amplifying means, further means comprising an electrical filter connected in series with the loud speaker for preventing said note or tone from passing into the loud speaker, a series tunable circuit bridged across the main circuit ahead of said filter for picking out said high frequency note or tone, a cold cathode tube with means for passing said note or tone thereto, means for applying a voltage to the starting anode of said tube and a relay connected to the cathode of the tube, said relay serving to actuate at least the projector apparatus when the tube fires whereby the sounds and pictures are properly co-related.

11. For use with a sound-slide film projector apparatus which produces hearing sounds for use in a loud speaker, from recording means such as a phonograph disc and simultaneously exhibits pictures in synchronism with the sounds; means for controlling the action of said projector which includes a note or tone of predetermined frequency, preferably higher than is essential for satisfactory quality of speech and music, impressed on said disc at predetermined positions defined by the pictures to be exhibited from the sound recording means, amplifying means for receiving and simultaneously passing therethrough all of the electrical impulses coming from the phonograph disc, a main circuit for receiving all of said amplified impulses coming from the amplifying means, further means comprising an electrical filter connected in series with the loud speaker for preventing said note or tone from passing into the loud speaker, a bridging circuit across the main circuit ahead of said filter, said bridging circuit including a condenser and inductance both being preferably adjustable and connected in series for picking out said note or tone, a cold cathode tube having its starting electrode interconnected with said bridging through a potentiometer and condenser so a starting voltage produced by the tone or note will be applied to the tube starting electrode, means for applying a voltage to the anode of said tube to cause current to flow therefrom to the cathode of the tube and a relay connected to the cathode of the tube, said relay serving to actuate at least the projector apparatus when the tube fires according to the governing note or tone.

SIDNEY B. COLEMAN.

REFERENCES CITED

The following references are of record in the file of this patent:

UNITED STATES PATENTS

| Number | Name | Date |
| --- | --- | --- |
| 1,909,765 | Jenkins et al. | May 16, 1933 |
| 1,987,544 | Wood et al. | Jan. 8, 1935 |
| 2,031,605 | Jenkins et al. | Feb. 25, 1936 |
| 2,038,976 | Wood et al. | Apr. 28, 1936 |
| 2,096,020 | Adair et al. | Oct. 19, 1937 |
| 2,116,314 | Jenkins et al. | May 3, 1938 |
| 2,141,203 | Abbott | Dec. 27, 1938 |
| 2,177,843 | Seeley | Oct. 31, 1939 |